(12) United States Patent
Meng et al.

(10) Patent No.: US 11,308,426 B2
(45) Date of Patent: Apr. 19, 2022

(54) SEQUENCE MODELING FOR SEARCHES

(71) Applicant: Microsoft Technology Licensing, LLC, Redmond, WA (US)

(72) Inventors: Meng Meng, San Jose, CA (US); Haifeng Zhao, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 595 days.

(21) Appl. No.: 16/234,377

(22) Filed: Dec. 27, 2018

(65) Prior Publication Data

US 2020/0210929 A1 Jul. 2, 2020

(51) Int. Cl.
| | |
|---|---|
| *G06Q 10/06* | (2012.01) |
| *G06N 5/04* | (2006.01) |
| *G06F 16/9535* | (2019.01) |
| *G06Q 10/10* | (2012.01) |
| *G06N 20/00* | (2019.01) |

(52) U.S. Cl.
CPC .... *G06Q 10/063112* (2013.01); *G06F 16/9535* (2019.01); *G06N 5/04* (2013.01); *G06N 20/00* (2019.01); *G06Q 10/1053* (2013.01)

(58) Field of Classification Search
CPC ....... G06Q 10/1053; G06Q 10/063112; G06N 5/04; G06N 20/00; G06F 16/9535
See application file for complete search history.

(56) References Cited

U.S. PATENT DOCUMENTS

| | | | |
|---|---|---|---|
| 2016/0379516 A1* | 12/2016 | Martinez | G09B 5/02 434/219 |
| 2019/0205838 A1* | 7/2019 | Fang | G06N 20/00 |

OTHER PUBLICATIONS

Concatenated Power Mean Word Embeddings as Universal Cross-Lingual Sentence Representations; Ruckle et al; Mar. 2018 (Year: 2018).*
A new approach for fuzzy information retrieval based on weighted power-mean averaging operators; Hong et al.; Apr. 2006 (Year: 2006).*
Fuzzy information retrieval in WWW: A survey; Kohli etal; Jan. 2014 (Year: 2014).*
NEMO: Next Career Move Prediction with COntextual Embedding; Li et al.; Apr. 2017 (Year: 2017).*
Word2Vec for Talent Acquisition; Nuri; Sep. 13, 2018 (Year: 2018).*

* cited by examiner

*Primary Examiner* — Deirdre D Hatcher
(74) *Attorney, Agent, or Firm* — Schwegman Lundberg & Woessner, P.A.

(57) ABSTRACT

The disclosed embodiments provide a system for performing sequence modeling for searches. During operation, the system obtains a sequence of jobs associated with activity by a member of an online system. Next, the system applies a word embedding model of a set of job histories to attributes of individual jobs in the sequence of jobs to produce embeddings for the individual jobs. The system then generates a set of power means from the embeddings. Finally, the system outputs the set of power means as an encoded representation of the sequence of jobs, wherein the set of power means is used in generating job recommendations related to the member.

16 Claims, 5 Drawing Sheets

SEQUENCE MODELING FOR SEARCHES

BACKGROUND

Field

The disclosed embodiments relate to sequence modeling. More specifically, the disclosed embodiments relate to techniques for performing sequence modeling for searches.

Related Art

Online networks may include nodes representing individuals and/or organizations, along with links between pairs of nodes that represent different types and/or levels of social familiarity between the entities represented by the nodes. For example, two nodes in an online network may be connected as friends, acquaintances, family members, classmates, and/or professional contacts. Online networks may further be tracked and/or maintained on web-based networking services, such as online networks that allow the individuals and/or organizations to establish and maintain professional connections, list work and community experience, endorse and/or recommend one another, promote products and/or services, and/or search and apply for jobs.

In turn, online networks may facilitate activities related to business, recruiting, networking, professional growth, and/or career development. For example, professionals may use an online network to locate prospects, maintain a professional image, establish and maintain relationships, and/or engage with other individuals and organizations. Similarly, recruiters may use the online network to search for candidates for job opportunities and/or open positions. At the same time, job seekers may use the online network to enhance their professional reputations, conduct job searches, reach out to connections for job opportunities, and apply to job listings. Consequently, use of online networks may be increased by improving the data and features that can be accessed through the online networks.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for performing sequence modeling for job-based searches. Each job-based search may be associated with one or more job sequences, such as a sequence of jobs in a candidate's job history, a sequence of jobs to which the candidate has applied, and/or a sequence of jobs and/or job attributes in job searches performed by the candidate.

More specifically, the disclosed embodiments provide a method, apparatus, and system for modeling sequences of jobs using word embeddings of the jobs' attributes. For example, a word embedding model may be trained using a collection and/or series of standardized job titles, industries, company names, schools, and/or fields of study in each user's education and/or job history. After the word embedding model is created, the word embedding model may convert titles and/or other attributes in the job histories into embeddings that are vector representations of the attributes. As a result, the word embedding model may capture patterns and/or semantic relationships among titles in the users' job histories.

The word embedding model is then used to produce embeddings of attributes in sequences of jobs. For example, the word embedding model may be applied to a company, title, and/or other attribute of each job in a job sequence to produce an embedding that is a vector representation of the attribute(s).

Embeddings for the jobs in the sequence are further aggregated and/or combined to generate fixed-length encoded representations of the job sequences. For example, embeddings representing a sequence of jobs in a candidate's work history, job searches, and/or job applications may be combined into a set of power means using a set of parameter values for a power mean function. The parameter values may include, but are not limited to, negative infinity (to extract the minimum value from each vector element in the embeddings), positive infinity (to extract the maximum value from each vector element in the embeddings), one (to compute an average value of each vector element in the embeddings), and/or an odd number greater than one (to encode additional information from the embeddings).

The encoded representations are then used to generate recommendations of jobs to candidates. For example, the encoded representations may be inputted with other features into a machine learning model that predicts a candidate's likelihood of having a positive response to (e.g., applying to, clicking on, and/or saving) a job. Scores from the machine learning model may then be used to rank a set of jobs and select a highest-ranked subset of the jobs as recommendations for the candidate.

By combining embeddings of jobs in job sequences into different types of power means, the disclosed embodiments compress information from variable numbers of jobs in the job sequences into multiple fixed-length vector representations of the job sequences, which may facilitate inputting of the job sequences into machine learning models that accept a fixed set of inputs. In contrast, conventional techniques may generate sentence embeddings as arithmetic averages of a sentence's word vectors, which can be lossy (e.g., multiple sentences can produce the same average vector). Conventional techniques may also, or instead, involve complex models such as convolutional neural networks (CNNs) and/ or long short-term memory (LSTM) networks, which involve significant computational overhead and/or labeled training data. Consequently, the disclosed embodiments may improve computer systems, applications, user experiences, tools, and/or technologies related to sequence modeling, language modeling, user recommendations, employment, recruiting, and/or hiring.

Sequence Modeling for Job-Based Searches

Figure 1:
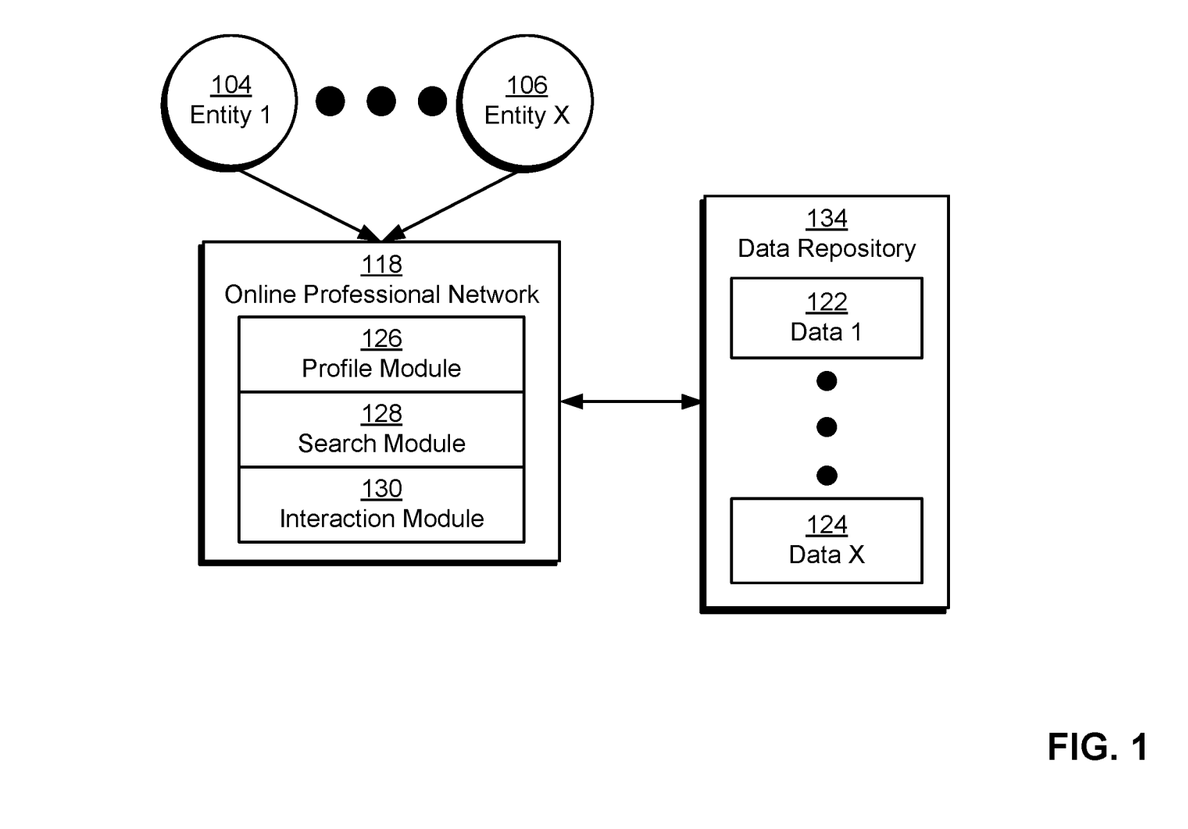
FIG. 1 shows a schematic of a system in accordance with the disclosed embodiments.

FIG. 1 shows a schematic of a system in accordance with the disclosed embodiments. As shown in FIG. 1, the system may include an online network 118 and/or other user community. For example, online network 118 may include an online professional network that is used by a set of entities (e.g., entity 1 104, entity x 106) to interact with one another in a professional and/or business context.

The entities may include users that use online network 118 to establish and maintain professional connections, list work and community experience, endorse and/or recommend one another, search and apply for jobs, and/or perform other actions. The entities may also include companies, employers, and/or recruiters that use online network 118 to list jobs, search for potential candidates, provide business-related updates to users, advertise, and/or take other action.

Online network 118 includes a profile module 126 that allows the entities to create and edit profiles containing information related to the entities' professional and/or industry backgrounds, experiences, summaries, job titles, projects, skills, and so on. Profile module 126 may also allow the entities to view the profiles of other entities in online network 118.

Profile module 126 may also include mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search module 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction module 130 that allows the entities to interact with one another on online network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or modules. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 may be tracked and stored in a database, data warehouse, cloud storage, and/or other data-storage mechanism providing data repository 134.

Data in data repository 134 may then be used to generate recommendations and/or other insights related to listings of jobs or opportunities within online network 118. For example, one or more components of online network 118 may track searches, clicks, views, text input, conversions, and/or other feedback during the entities' interaction with a job search tool in online network 118. The feedback may be stored in data repository 134 and used as training data for one or more machine learning models, and the output of the machine learning model(s) may be used to display and/or otherwise recommend a number of job listings to current or potential job seekers in online network 118.

More specifically, data in data repository 134 and one or more machine learning models are used to produce rankings of candidates for jobs or opportunities listed within or outside online network 118. The candidates may include users who have viewed, searched for, or applied to jobs, positions, roles, and/or opportunities, within or outside online network 118. The candidates may also, or instead, include users and/or members of online network 118 with skills, work experience, and/or other attributes or qualifications that match the corresponding jobs, positions, roles, and/or opportunities.

After the candidates are identified, profile and/or activity data of the candidates may be inputted into the machine learning model(s), along with features and/or characteristics of the corresponding opportunities (e.g., required or desired skills, education, experience, industry, title, etc.). The machine learning model(s) may output scores representing the strength of the candidates with respect to the opportunities and/or qualifications related to the opportunities (e.g., skills, current position, previous positions, overall qualifications, etc.). The machine learning model(s) may also, or instead, generate scores representing the candidates' level of interest in the opportunities. For example, the machine learning model(s) may generate scores based on similarities between the candidates' profile data with online network 118 and descriptions of the opportunities. The model(s) may further adjust the scores based on social and/or other validation of the candidates' profile data (e.g., endorsements of skills, recommendations, accomplishments, awards, etc.).

In turn, rankings based on the scores and/or associated insights may improve the quality of the candidates and/or recommendations of opportunities to the candidates, increase user activity with online network 118, and/or guide the decisions of the candidates and/or moderators involved in screening for or placing the opportunities (e.g., hiring managers, recruiters, human resources professionals, etc.). For example, one or more components of online network 118 may display and/or otherwise output a member's position (e.g., top 10%, top 20 out of 138, etc.) in a ranking of candidates for a job to encourage the member to apply for jobs in which the member is highly ranked. In a second example, the component(s) may account for a candidate's relative interest and/or strength with respect to a set of jobs during ordering of the jobs as search results and/or job recommendations that are subsequently displayed to the candidate. In a third example, the component(s) may recommend highly ranked candidates for a position to recruiters and/or other moderators as potential applicants and/or interview candidates for the position. In a fourth example, the component(s) may recommend jobs to a candidate based on the predicted relevance or attractiveness of the jobs to the candidate and/or the candidate's likelihood of applying to the jobs.

Figure 2:
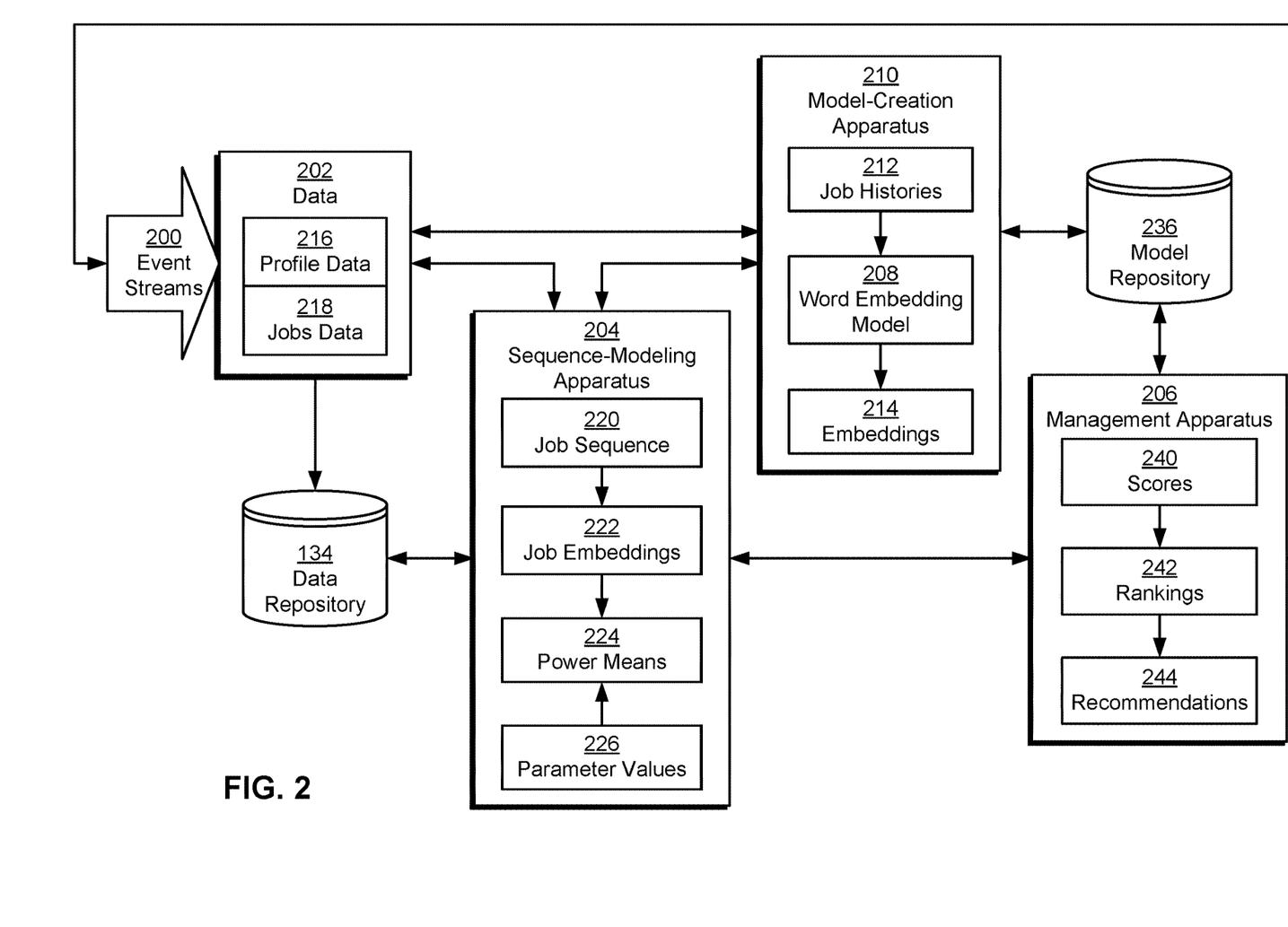
FIG. 2 shows a system for processing data in accordance with the disclosed embodiments.

In one or more embodiments, online network 118 includes functionality to improve the timeliness, relevance, and/or accuracy of job recommendations outputted to the candidates. As shown in FIG. 2, data repository 134 and/or another primary data store may be queried for data 202 that includes profile data 216 for members of an online system (e.g., online network 118 of FIG. 1), as well as jobs data 218 for jobs that are listed or described within or outside the online system. Profile data 216 includes data associated with member profiles in the online system. For example, profile data 216 for an online professional network may include a set of attributes for each user, such as demographic (e.g., gender, age range, nationality, location, language), professional (e.g., job title, professional summary, employer, industry, experience, skills, seniority level, professional endorsements), social (e.g., organizations of which the user is a member, geographic area of residence), and/or educational (e.g., degree, university attended, certifications, publications) attributes. Profile data 216 may also include a set of groups to which the user belongs, the user's contacts and/or connections, and/or other data related to the user's interaction with the online system.

Attributes of the members from profile data 216 may be matched to a number of member segments, with each member segment containing a group of members that share one or more common attributes. For example, member segments in the online system may be defined to include members with the same industry, title, location, and/or language.

Connection information in profile data 216 may additionally be combined into a graph, with nodes in the graph representing entities (e.g., users, schools, companies, locations, etc.) in the online system. Edges between the nodes in the graph may represent relationships between the corresponding entities, such as connections between pairs of members, education of members at schools, employment of members at companies, following of a member or company by another member, business relationships and/or partnerships between organizations, and/or residence of members at locations.

Jobs data 218 includes structured and/or unstructured data for job listings and/or job descriptions that are posted and/or provided by members of the online system. For example, jobs data 218 for a given job or job listing may include a declared or inferred title, company, required or desired skills, responsibilities, qualifications, role, location, industry, seniority, salary range, benefits, and/or member segment.

In one or more embodiments, data repository 134 stores data that represents standardized, organized, and/or classified attributes in profile data 216 and/or jobs data 218. For example, skills in profile data 216 and/or jobs data 218 may be organized into a hierarchical taxonomy that is stored in data repository 134. The taxonomy may model relationships between skills and/or sets of related skills (e.g., "Java programming" is related to or a subset of "software engineering") and/or standardize identical or highly related skills (e.g., "Java programming," "Java development," "Android development," and "Java programming language" are standardized to "Java"). In another example, locations in data repository 134 may include cities, metropolitan areas, states, countries, continents, and/or other standardized geographical regions. In a third example, data repository 134 includes standardized company names for a set of known and/or verified companies associated with the members and/or jobs. In a fourth example, data repository 134 includes standardized titles, seniorities, and/or industries for various jobs, members, and/or companies in the online system. In a fifth example, data repository 134 includes standardized time periods (e.g., daily, weekly, monthly, quarterly, yearly, etc.) that can be used to retrieve profile data 216, jobs data 218, and/or other data 202 that is represented by the time periods (e.g., starting a job in a given month or year, graduating from university within a five-year span, job listings posted within a two-week period, etc.).

Data 202 in data repository 134 may further be updated using records of recent activity received over one or more event streams 200. For example, event streams 200 may be generated and/or maintained using a distributed streaming platform such as Apache Kafka (Kafka™ is a registered trademark of the Apache Software Foundation). One or more event streams 200 may also, or instead, be provided by a change data capture (CDC) pipeline that propagates changes to data 202 from a source of truth for data 202. For example, an event containing a record of a recent profile update, job search, job view, job application, response to a job application, connection invitation, post, like, comment, share, and/or other recent member activity within or outside the community may be generated in response to the activity. The record may then be propagated to components subscribing to event streams 200 on a nearline basis.

Profile data 216 and/or jobs data 218 may further include job histories 212 of members of the online system. Each job history includes a chronological sequence of jobs for a given member that terminates in the member's current job and/or the member's most recently listed job. As a result, the job history may be assembled from current and/or previous jobs listed in the member's current profile data 216. For example, the job history may include titles, companies, locations, industries, seniorities, locations, and/or other attributes of the member's current and/or previous jobs. The job history may optionally include schools, fields of study, and/or degrees from the member's educational background.

Job histories 212 may be supplemented with job listings, job descriptions, and/or other information in jobs data 218. For example, a job listing that is posted in the online system may be matched to a member that applies for and subsequently accepts an offer for the corresponding job. In turn, the job in the member's job history may be populated and/or associated with skills, benefits, qualifications, requirements, salary information, and/or other information from the job listing.

A model-creation apparatus 210 creates a word embedding model 208 from attributes in job histories 212. After word embedding model 208 is created, word embedding model 208 generates embeddings 214 based on attributes in profile data 216 and/or jobs data 218. For example, word embedding model 208 may be a word2vec model that outputs embeddings 214 in a vector space based on groupings of standardized attributes in job histories 212 from data repository 134.

More specifically, model-creation apparatus 210 generates a collection of standardized job titles, company names, industries, school names, fields of study, and/or other attributes from each member's job history and inputs the collection into word embedding model 208. For example, each member may be represented by a "document" that is inputted into word embedding model 208. The document may include a "sentence" containing a series of educational attributes (e.g., one or more schools and the corresponding fields of study) followed by a series of job-related attributes (e.g., company, title, and/or industry for each job) from the member's job history. As a result, model-creation apparatus 210 may train word embedding model 208 so that standardized attributes that are shared by a relatively large proportion of job histories 212 are closer to one another in the vector space than standardized attributes that are shared by a smaller proportion of job histories 212. In other words, word embedding model 208 may capture patterns and/or semantic relationships among titles and/or other attributes in job histories 212, so that similarities and/or trends in the attributes within job histories 212 are reflected in distances among embeddings 214 outputted by word embedding model 208.

After word embedding model 208 is created and/or updated, model-creation apparatus 210 stores parameters of word embedding model 208 in a model repository 236. For example, model-creation apparatus 210 may replace old values of the parameters in model repository 236 with the updated parameters, or model-creation apparatus 210 may store the updated parameters separately from the old values (e.g., by storing each set of parameters with a different version number of the corresponding model). Model-creation apparatus 210 may also, or instead, provide word embedding model 208 to a sequence-modeling apparatus 204.

Sequence-modeling apparatus 204 uses word embedding model 208 and data 202 from event streams 200 and/or data repository 134 to generate job embeddings 222 for a job sequence 220 representing activity by a member of the online system. In one or more embodiments, job sequence 220 includes a chronological ordering of jobs associated with one or more types of activity by a member of the online system. For example, job sequence 220 may include a job history from a member profile in the online system; a job search history containing jobs viewed, clicked, searched for, and/or otherwise interacted with during a series of job searches by a member over a period (e.g., a user session, a day, a week, a month, etc.); and/or a job application history containing job applications submitted by the member over a period.

In turn, job embeddings 220 include collections of embeddings 214 outputted by word embedding model 208 for individual jobs in job sequence 220. For example, sequence-modeling apparatus 204 may input the title, company, industry, and/or other attributes of each job in a member's job history into word embedding model 208, and word embedding model 208 may output an embedding of the inputted attribute(s) as a fixed-length vector representation of the job. Multiple embeddings of jobs from the job history may then be collected into a set of job embeddings 222 for the job history.

Next, sequence-modeling apparatus 204 generates an encoded representation of job sequence 220 as a set of power means 224 from job embeddings 222. In one or more embodiments, each power mean is generated using the following formula:

$$M_p(x_1, \ldots, x_n) = \left(\frac{1}{n}\sum_{i=1}^{n} x_i^p\right)^{\frac{1}{p}}.$$

In the above formula, $M_p$ represents a power mean function with a numeric parameter p and inputs $x_1, \ldots, x_n$. To calculate power means 224, sequence-modeling apparatus 204 inputs job embeddings 222 as a set of input vectors $x_1, \ldots, x_n$ and parameter values 226 as values of p into the power mean function, and the power mean function outputs power means 224 as fixed-length vector representations of all jobs in job sequence 220.

In one or more embodiments, numeric parameter values 226 used to generate power means 224 from job embeddings 222 are selected to reduce information loss during encoding of job sequence 220. For example, parameter values 226 may include negative infinity to produce a power mean that contains element-wise minimum values from job embeddings 222, positive infinity to produce a power mean that contains element-wise maximum values from the same job embeddings 222, one to produce a power mean that contains an element-wise arithmetic mean from the same job embeddings 222, and an odd number greater than one to encode additional information and/or sign information from job embeddings 222. As a result, power means 224 may capture greater amounts of information than a conventional sentence embedding that is represented using only an arithmetic mean of a sentence's word vectors.

After power means 224 with known and/or fixed parameter values 226 are calculated for job embeddings 222 associated with a given job sequence 220, sequence-modeling apparatus 204 may store power means 224 as one or more fixed-length encoded representations of job sequence 220 in data repository 134 for subsequent retrieval and use. Sequence-modeling apparatus 204 may also, or instead, provide power means 224 to model-creation apparatus 210, a management apparatus 206, and/or another component of the system for use in generating additional models and/or recommendations 244 using the features.

In one or more embodiments, management apparatus 206 includes functionality to generate recommendations 244 related to one or more sets of candidates based on power means 224 and/or other features inputted into one or more machine learning models. For example, management apparatus 206 may generate recommendations 244 as search results of the candidates' job searches, search results of recruiters' candidate searches for specific jobs, job recommendations that are displayed and/or transmitted to the candidates, and/or within other contexts related to job seeking, recruiting, careers, and/or hiring.

To generate recommendations 244, management apparatus 206 retrieves, from model repository 236 and/or model-creation apparatus 210, the latest parameters of one or more machine learning models that generate predictions related to a candidate's compatibility with a job, the likelihood that the candidate has a positive response to (e.g., clicks on, applies to, and/or saves) the job, and/or the candidate's strength or quality with respect to requirements or qualifications of job. Next, management apparatus 206 inputs power means 224 representing a job history, job search history, job application history, and/or another job sequence associated with the candidate's activity into the machine learning model(s). Management apparatus 206 also inputs additional features, such as encodings and/or embeddings 214 of one or more jobs and/or parameters of a job search query by the candidate, into the machine learning model(s).

Management apparatus 206 uses the model parameters and features to generate a set of scores 240 between the candidate and a set of jobs. For example, management apparatus 206 may apply a logistic regression model, deep learning model, support vector machine, tree-based model, and/or another type of machine learning model to features for a candidate-job pair to produce a score from 0 to 1 that represents the probability that the candidate has a positive response to a job recommendation (e.g., recommendations 244) that is displayed to the candidate.

Management apparatus 206 then generates rankings 242 of the jobs by the corresponding scores 240. For example, management apparatus 206 may rank jobs for a candidate by descending predicted likelihood of positively responding to the jobs. Finally, management apparatus 206 outputs some or all jobs in rankings 242 as recommendations 244 to the corresponding candidates. For example, management apparatus 206 may display some or all jobs that are ranked by a candidate's descending likelihood of applying to the jobs within a job search tool, email, notification, message, and/or another communication containing job recommendations 244 to the candidate. Subsequent responses to recommendations 244 may, in turn, be used to generate events that are fed back into the system and used to update job sequences, job embeddings 222, power means 224, word embedding model 208, the machine learning models, and/or recommendations 244.

By combining embeddings of jobs in job sequences into different types of power means, the disclosed embodiments may compress information from variable numbers of jobs in the job sequences into a known number of fixed-length vector representations of the job sequences. In contrast, conventional techniques may generate sentence embeddings as lossy arithmetic averages of a sentence's word vectors and/or require complex models such as convolutional neural networks (CNNs) and/or long short-term memory (LSTM) networks. Consequently, the disclosed embodiments may improve computer systems, applications, user experiences, tools, and/or technologies related to sequence modeling, language modeling, user recommendations, employment, recruiting, and/or hiring.

Those skilled in the art will appreciate that the system of FIG. 2 may be implemented in a variety of ways. First, sequence-modeling apparatus 204, model-creation apparatus 210, management apparatus 206, data repository 134, and/or model repository 236 may be provided by a single physical machine, multiple computer systems, one or more virtual machines, a grid, one or more databases, one or more filesystems, and/or a cloud computing system. Sequence-modeling apparatus 204, model-creation apparatus 210, and management apparatus 206 may additionally be implemented together and/or separately by one or more hardware and/or software components and/or layers. Sequence-modeling apparatus 204, model-creation apparatus 210, and/or management apparatus 206 may further execute in an offline, online, and/or on-demand basis to accommodate requirements or limitations associated with the processing, performance, or scalability of the system; the availability of job histories 212 and/or job sequences for candidates; and/or recent job-seeking activity by candidates (e.g., user sessions, job searches, job views, clicks on jobs, applications for jobs, etc.).

Second, a number of models and/or techniques may be used to generate embeddings 214, job embeddings 222, power means 224, scores 240, and/or rankings 242. For example, the functionality of word embedding model 208 may be provided by a Large-Scale Information Network Embedding (LINE), principal component analysis (PCA), latent semantic analysis (LSA), and/or other technique that generates a low-dimensional embedding space from documents and/or terms. Multiple versions of word embedding model 208 may also be adapted to different subsets of candidates (e.g., different member segments in the community), jobs, and/or attributes, or the same word embedding model 208 may be used to generate embeddings 214 and/or job embeddings 222 for all candidates, jobs, and/or job sequences.

Third, the system of FIG. 2 may be adapted to different types of features and/or embeddings 214. For example, word embedding model 208 may be used to generate embeddings 214 and/or corresponding features related to awards, publications, patents, group memberships, profile summaries, and/or other attributes that can be grouped under users or other entities.

Figure 3:
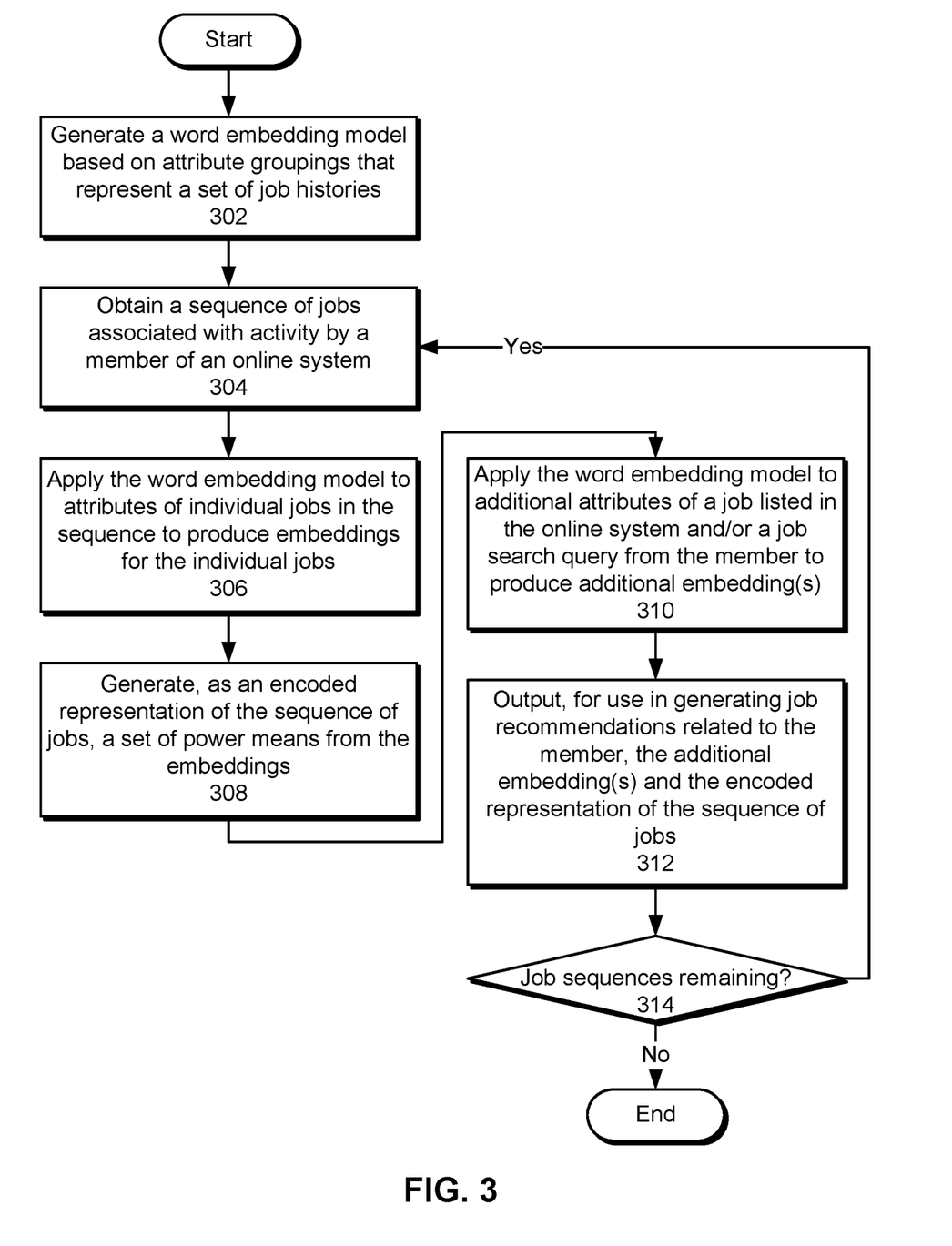
FIG. 3 shows a flowchart illustrating a process of performing sequence modeling for job-based searches in accordance with the disclosed embodiments.

FIG. 3 shows a flowchart illustrating a process of performing sequence modeling for job-based searches in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a word embedding model is generated based on attribute groupings that represent a set of job histories (operation 302), as described in further detail below with respect to FIG. 4. Next, a sequence of jobs associated with activity by a member of an online system is obtained (operation 304). For example, the sequence of jobs may include a job history, job search history, job application history, and/or another chronologically ordered sequence of jobs related to a type of activity performed by and/or affecting the member.

The word embedding model is applied to attributes of individual jobs in the sequence to produce embeddings for the individual jobs (operation 306). For example, the word embedding model may be used to generate an embedding from the title, company, and/or industry associated with each job in the job sequence.

A set of power means is then generated from the embeddings as an encoded representation of the sequence of jobs (operation 308). For example, the power means may be calculated by applying a power mean function to vector elements of the embeddings. The power means may be calculated based on a known and/or fixed set of parameter values for a power mean function, such as negative infinity, positive infinity, one, and/or one or more odd integers greater than one.

The word embedding model is further applied to additional attributes of a job listed in the online system and/or a job search query from the member to produce one or more additional embeddings (operation 310). For example, the word embedding model may be used to generate an embedding from a title, industry, company, seniority, location, and/or another attribute associated with the job and/or job search query.

Finally, the additional embedding(s) and the encoded representation of the sequence of jobs are outputted for use in generating job recommendations related to the member (operation 312). For example, the additional embedding(s) and the encoded representation of the job sequence may be inputted into a machine learning model, and the machine learning model may output a score representing a likelihood of the candidate responding positively to the job. A recommendation of the job to the candidate may then be generated based on a ranking of jobs by score and/or by applying a threshold to the score.

Operations 304-312 may be repeated for remaining job sequences (operation 314). For example, a separate encoded representation may be generated for each job history, job search history, and/or job application history associated with a member identified as a job seeker. The encoded representation may be inputted into a machine learning model with additional features and/or encodings, and the output of the machine learning model may be used to recommend jobs to the member and/or to recommend members as job candidates to job posters.

Figure 4:
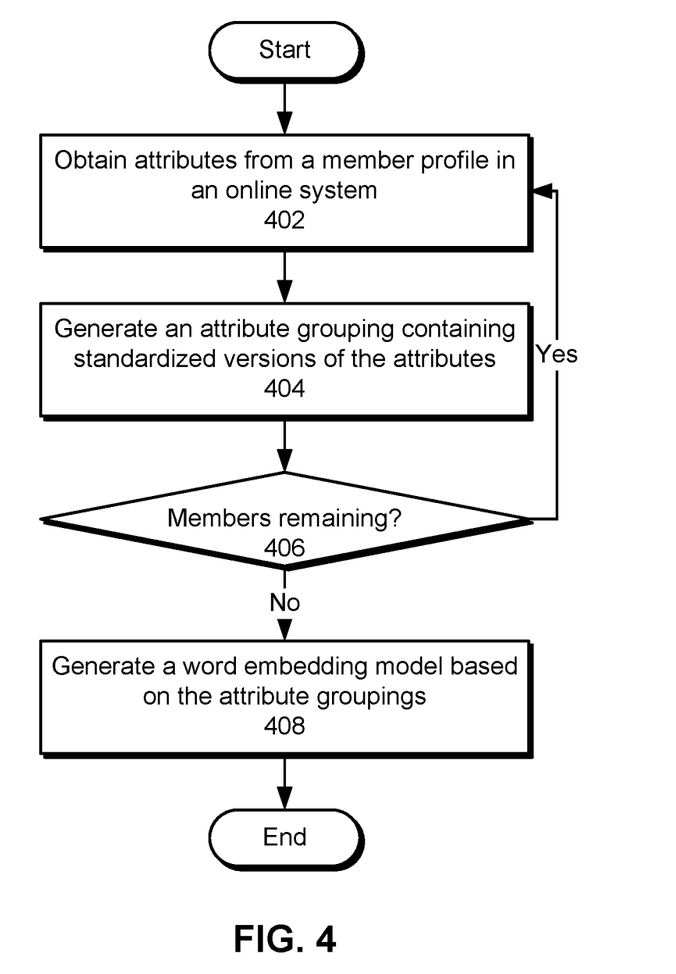
FIG. 4 shows a flowchart illustrating a process of producing a word embedding model of job histories in accordance with the disclosed embodiments.

FIG. 4 shows a flowchart illustrating a process of producing a word embedding model of job histories in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, attributes from a member profile in an online network are obtained (operation 402). For example, the attributes may include a member's current and/or past titles, companies, industries, locations, and/or seniorities. The attributes may also, or instead, include the member's schools, fields of study, degrees, and/or other aspects of the member's educational background.

Next, an attribute grouping containing standardized versions of the attributes is generated (operation 404). For example, standardized versions of the attributes may be used to form a "sentence" and/or other collection of words that describe the member's job history and/or educational background.

Operations 402-404 may be repeated for remaining members (operation 406). For example, groupings of standardized education and/or job history attributes may be generated for some or all members of an online network (e.g., online network 118 of FIG. 1) and/or from other sources of job histories (e.g., public records, employment websites, etc.).

The word embedding model is then generated based on the attribute groupings (operation 408) for the members. For example, a word2vec model may be trained using the groupings, so that embeddings produced by the model reflect relationships and/or trends in the members' education and/or job histories. The model and/or embeddings may subsequently be used to generate encoded representations of job sequences for the members, as discussed above.

Figure 5:
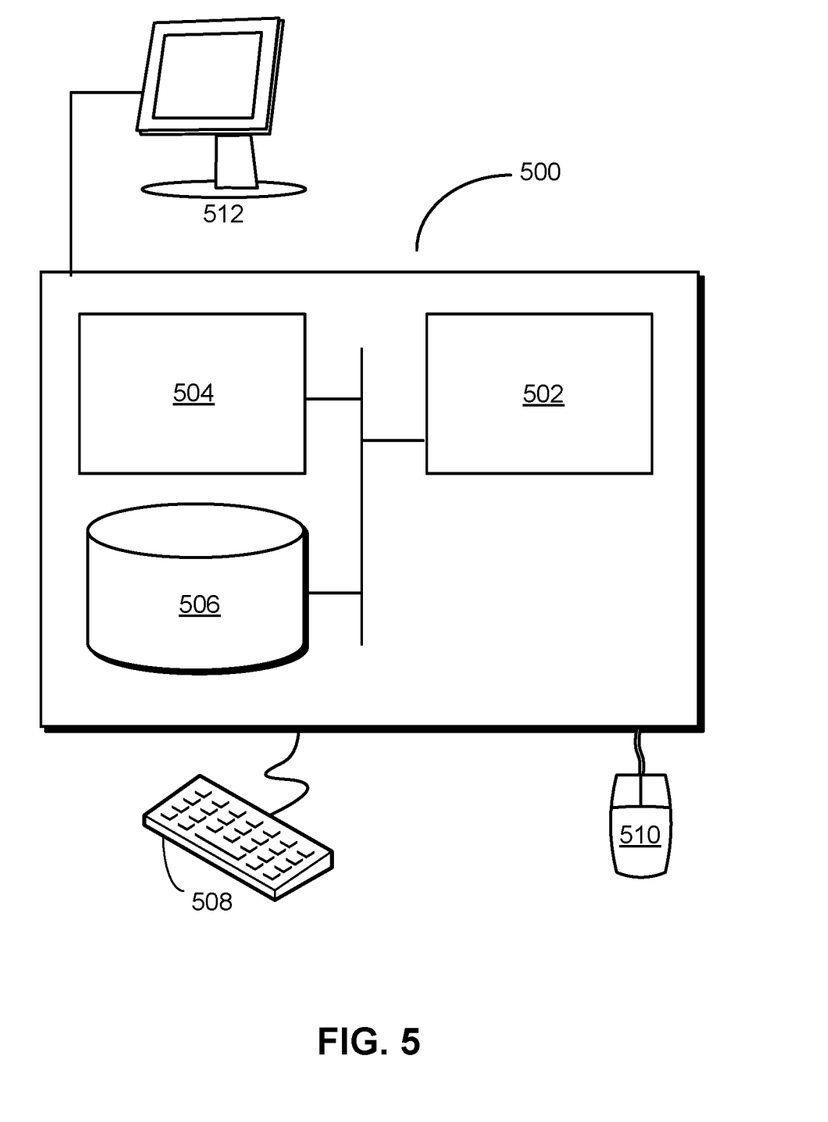
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for performing sequence modeling for job-based searches. The system includes a sequence-modeling apparatus, a model-creation apparatus, and a management apparatus, one or more of which may alternatively be termed or implemented as a module, mechanism, or other type of system component. The model-creation apparatus generates a word embedding model based on attribute groupings that reflect a set of job histories. The sequence-modeling apparatus obtains a sequence of jobs associated with activity by a member of an online system. Next, the sequence-modeling apparatus applies the word embedding model to attributes of individual jobs in the sequence of jobs to produce embeddings for the individual jobs. The sequence-modeling then generates a set of power means from the embeddings. Finally, the management apparatus outputs, for use in generating job recommendations related to the member, the set of power means as an encoded representation of the sequence of jobs.

In addition, one or more components of computer system 500 may be remotely located and connected to the other components over a network. Portions of the present embodiments (e.g., sequence-modeling, apparatus, model-creation apparatus, management apparatus, data repository, model repository, online network, etc.) may also be located on different nodes of a distributed system that implements the embodiments. For example, the present embodiments may be implemented using a cloud computing system that generates job recommendations and/or embeddings of job sequences for a set of remote users.

By configuring privacy controls or settings as they desire, members of a social network, a professional network, or other user community that may use or interact with embodiments described herein can control or restrict the information that is collected from them, the information that is provided to them, their interactions with such information and with other members, and/or how such information is used. Implementation of these embodiments is not intended to supersede or interfere with the members' privacy settings.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method, comprising:
   using a word embedding model, generating word embeddings for words used as job attributes, the word embedding model trained to generate the word embeddings with training data comprising job attributes obtained from member profiles of members of an online system, the job attributes comprising one or more of job titles, industries, company names, schools, and/or fields of study;
   processing a first member profile of a first member of the online system to identify one or more words associated with each job in a sequence of jobs associated with the first member;
   converting the one or more words associated with each job in the sequence of jobs to a pre-trained word embedding generated by the word embedding model;
   generating a set of power means from the pre-trained word embeddings; and
   outputting the set of power means as a fixed length encoded representation of the sequence of jobs.

2. The method of claim 1, wherein generating the set of power means from the pre-trained word embeddings comprises:
   calculating the set of power means from the pre-trained word embeddings based on a set of parameter values for a power mean function.

3. The method of claim 2, wherein the set of parameter values comprises:
   negative infinity;
   positive infinity;
   one; and
   an odd number greater than one.

4. The method of claim 1, further comprising:
   training the word embedding model to generate the word embeddings for words used as job attributes based on groupings of job attributes that represent the sequence of jobs.

5. The method of claim 4, wherein the job attributes in the grouping of job attributes comprise:
   a previous title;
   a current title; and
   a company.

6. The method of claim 4, wherein the job attributes in the grouping of job attributes comprise:
   a school;
   a field of study; and
   an industry.

7. The method of claim 1, further comprising:
   providing as input to a machine learning model the fixed length encoded representation of the sequence of jobs and an additional embedding for a job associated with a job listing hosted by the online system;
   receiving, as output from the machine learning model, a score representing a likelihood of a positive response to the job associated with the job listing by the first member; and
   generating a recommendation of the job associated with the job listing to the first member based on the score.

8. The method of claim 1, wherein the sequence of jobs comprises at least one of:
   a job history of the first member;
   a job search history of the first member; and
   a job application history of the first member.

9. The method of claim 1, wherein the job attributes comprise at least one of:
   a title;
   a company; and
   an industry.

10. A system, comprising:
    one or more processors; and
    memory storing instructions that, when executed by the one or more processors, cause the system to:
    using a word embedding model, generate word embeddings for words used as job attributes, the word embedding model trained to generate the word embeddings with training data comprising job attributes obtained from member profiles of members of an online system, the job attributes comprising one or more of job titles, industries, company names, schools, and/or fields of study;
    process a first member profile of a first member of the online system to identify one or more words associated with each job in a sequence of jobs associated with the first member;
    convert the one or more words associated with each job in the sequence of jobs to a pre-trained word embedding generated by the word embedding model;
    generate a set of power means from the pre-trained word embeddings; and
    output the set of power means as a fixed length encoded representation of the sequence of jobs.

11. The system of claim 10, wherein generating the set of power means from the pre-trained word embeddings comprises:
    calculating the set of power means from the pre-trained word embeddings based on a set of parameter values for a power mean function.

12. The system of claim 11, wherein the set of parameter values comprises:
    negative infinity;
    positive infinity;
    one; and
    an odd number greater than one.

13. The system of claim 10, wherein the memory further stores instructions that, when executed by the one or more processors, cause the system to:
    train the word embedding model to generate the word embeddings for words used as job attributes based on groupings of job attributes that represent the sequence of jobs.

14. The system of claim 10, further comprising:
    providing as input to a machine learning model the fixed length encoded representation of the sequence of jobs and an additional embedding of a job associated with a job listing hosted by the online system;

receiving, as output from the machine learning model, a score representing a likelihood of a positive response to the job associated with the job listing by the first member; and generating a recommendation of the job associated with the job listing to the first member based on the score.

15. The system of claim 10, wherein the sequence of jobs comprises at least one of:

a job history of the first member;
a job search history of the first member; and
a job application history of the first member.

16. A non-transitory computer-readable storage medium storing instructions that when executed by a computer cause the computer to perform a method, the method comprising:

using a word embedding model, generating word embeddings for words used as job attributes, the word embedding model trained to generate the word embeddings with training data comprising job attributes obtained from member profiles of members of an online system, the job attributes comprising one or more of job titles, industries, company names, schools, and/or fields of study;

processing a first member profile of a first member of the online system to identify one or more words associated with each job in a sequence of jobs associated with the first member;

converting the one or more words associated with each job in the sequence of jobs to a pre-trained word embedding generated by the word embedding model;

generating a set of power means from the pre-trained word embeddings; and outputting the set of power means as a fixed length encoded representation of the sequence of jobs.

* * * * *

UNITED STATES PATENT AND TRADEMARK OFFICE
CERTIFICATE OF CORRECTION

PATENT NO. : 11,308,426 B2  
APPLICATION NO. : 16/234377  
DATED : April 19, 2022  
INVENTOR(S) : Meng et al.

Page 1 of 1

It is certified that error appears in the above-identified patent and that said Letters Patent is hereby corrected as shown below:

On the Title Page

In Column 2, Item (56) under "Other Publications", Line 7, delete "Kohli etal;" and insert --Kohli et al;-- therefor In Column 2, Item (56) under "Other Publications", Line 9, delete "COntextual" and insert --Contextual-- therefor Signed and Sealed this  
Twenty-eighth Day of June, 2022

Katherine Kelly Vidal  
*Director of the United States Patent and Trademark Office*